(12) United States Patent
Antoun et al.

(10) Patent No.: US 12,135,714 B2
(45) Date of Patent: Nov. 5, 2024

(54) QUERY GRAPH EMBEDDING

(71) Applicant: TERADATA US, INC., San Diego, CA (US)

(72) Inventors: Christopher James Antoun, Santa Clara, CA (US); Matthew Edward Antoun, Santa Clara, CA (US); Artur Borycki, San Marcos, CA (US); Douglas Paul Brown, Rancho Santa Fe, CA (US)

(73) Assignee: Teradata US, Inc., San Diego, CA (US)

( * ) Notice: Subject to any disclaimer, the term of this patent is extended or adjusted under 35 U.S.C. 154(b) by 163 days.

(21) Appl. No.: 18/052,609

(22) Filed: Nov. 4, 2022

(65) Prior Publication Data

US 2024/0152515 A1 May 9, 2024

(51) Int. Cl.
*G06F 16/2453* (2019.01)
*G06F 11/34* (2006.01)
*G06F 16/2457* (2019.01)

(52) U.S. Cl.
CPC .... *G06F 16/24542* (2019.01); *G06F 11/3414* (2013.01); *G06F 16/24575* (2019.01)

(58) Field of Classification Search
CPC ................................................ G06F 16/24542
USPC ......................................................... 707/718
See application file for complete search history.

(56) References Cited

U.S. PATENT DOCUMENTS

| | | | |
|---|---|---|---|
| 2010/0082599 A1* | 4/2010 | Graefe | G06F 16/217 707/E17.014 |
| 2019/0325292 A1* | 10/2019 | Remis | G06N 3/044 |
| 2020/0133952 A1* | 4/2020 | Sheinin | G06N 3/045 |
| 2020/0342007 A1* | 10/2020 | Bracholdt | G06F 16/288 |
| 2021/0263932 A1* | 8/2021 | Shaffer | G06N 3/08 |
| 2021/0334697 A1* | 10/2021 | Hanley | G06N 3/08 |

OTHER PUBLICATIONS

Battaglia et al., Relational inductive biases, deep learning, and graph networks, Oct. 17, 2018 (40 pages).
Ganapathi et al., Predicting Multiple Metrics for Queries: Better Decisions Enabled by Machine Learning, 2009 (12 pages).
Jain et al., Query2Vec: An Evaluation of NLP Techniques for Generalized Workload Analytics, Feb. 2, 2018 (14 pages).
Kipf et al., Learned Cardinalities: Estimating Correlated Joins with Deep Learning, Dec. 18, 2018 (8 pages).
Ma et al., Query-basedWorkload Forecasting for Self-Driving Database Management Systems, 2018 (15 pages).
Mozafari et al., Performance and Resource Modeling in Highly-Concurrent OLTP Workloads, 2013 (13 pages).
Ortiz et al., An Empirical Analysis of Deep Learning for Cardinality Estimation, Sep. 12, 2019 (17 pages).

(Continued)

*Primary Examiner* — Muluemebet Gurmu
(74) *Attorney, Agent, or Firm* — Trop Pruner & Hu P.C.

(57) ABSTRACT

In some examples, a system receives an input graph representation of one or more query plans for one or more database queries, and generates, by an embedding machine learning model based on the input graph representation, a feature vector that provides a distributed representation of the one or more query plans. The system determines, using the feature vector, one or more user behaviors and/or workload characteristics of one or more workloads in one or more database systems.

19 Claims, 3 Drawing Sheets

(56) References Cited

OTHER PUBLICATIONS

Sanchez et al., A Gentle Introduction to Graph Neural Networks, Sept. 2, 2021 (30 pages).
Wu et al., A Comprehensive Survey on Graph Neural Networks, Dec. 4, 2019 (22 pages).
Xu et al., How Powerful Are Graph Neural Networks, Feb. 22, 2019 (17 pages).
Zhou et al., Query Performance Prediction for Concurrent Queries using Graph Embedding, May 2020 (13 pages).
Bengio et al., Representation Learning: A Review and New Perspectives, Apr. 23, 2014 (30 pages).
Elman, Jeffrey L., Distributed Representations, Simple Recurrent Networks, and Grammatical Structure, Machine Learning, 1991 (31 pages).
Hinton, Geoffrey E., Learning distributed representations of concepts, 1984 (8 pages).
Rajasekharan, Deep Learning: What is meant by a distributed representation? downloaded Sep. 24, 2022 (5 pages).
Pytorch, Torch_Geometric.Data downloaded Oct. 5, 2022 (34 pages).

* cited by examiner

QUERY GRAPH EMBEDDING

BACKGROUND

A relational database management system (DBMS) stores databases that include collections of logically related data arranged in a predetermined format, such as in relational tables that contain rows and columns. To access the content of a table in a database, database queries according to a standard database query language (such as the Structured Query Language or SQL) are submitted to the DBMS. A database query can also be issued to insert new entries into a table of a database (such as to insert a row into the table), modify the content of the table, or to delete entries from the table.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Analysis tasks can be performed in database domains, including machine learning tasks, such as predictions, classifications, routing of database queries, similarity searches, and so forth. Analysis tasks can also include other types of tasks, such as clustering tasks to cluster data into multiple clusters. A "database domain" can refer to any domain that includes one or more database systems in which database operations can be performed in response to database queries.

Analysis tasks such as machine learning tasks and/or clustering tasks can be based on feature vectors containing features derived from representations of database queries to be executed on database system(s). Deriving features from query text (e.g., text in SQL statements) may lead to sub-optimal results. For example, there may be numerous ways to formulate the same semantically equivalent query, such that deriving different features from semantically equivalent queries can lead to increased quantities of features. Performing analysis tasks based on feature vectors with very large quantities of features can be computationally impractical. Further, the text of a query contains table names and column names that are arbitrary and subject to change; assigning different features to present different table and column names that may change over time can also lead to increased quantities of features. Additionally, the text of a database query may contain table names and column names that users may not wish to make public; using features that contain such sensitive table and column names may not be desirable.

In some examples, features may be manually encoded from database queries. However, such manual techniques of feature selection may not take advantage of all of the information available for database queries. Moreover, manual feature selection may not scale well; as features are added, the quantity of features in feature vectors can quickly increase. Additionally, manual feature selection may fail to capture information about an internal structure of a query plan for a database query.

In accordance with some implementations of the present disclosure, increased quality query featurization techniques or mechanisms are provided to produce feature vectors that serve as the foundation of various analysis tasks, such as machine learning tasks and/or clustering tasks and/or other types of tasks. A "feature vector" includes a collection of features. A "feature" can refer to any information element that can be derived from a representation of one or more database queries. A simple example of a feature is a relational table column or any other individual element of a database domain. A more complex example of a feature is in the form of a distributed representation in which shared aspects of multiple elements of a database domain can be represented by the feature. Each feature of feature vector of a distributed representation can represent multiple elements of a database domain.

Query featurization techniques or mechanisms according to some examples of the present disclosure are able to capture the structure of representations of database queries that database systems use internally to represent the database queries. For example, a database system includes a query optimizer that produces candidate query plans for a database query. A query plan includes a collection of executable steps to be performed in a database system to satisfy a database query. The query plan provides a highly structured internal representation of the database query.

A query featurization technique or mechanism according to some examples of the present disclosure receives an input graph representation of one or more query plans for one or more database queries, and generates, by an embedding machine learning model based on the input graph representation, a feature vector that provides a distributed representation of the one or more query plans. The query featurization technique or mechanism determines, by using the feature vector, one or more user behaviors and/or workload characteristics of one or more workloads in a database system. An embedding is a mapping of attributes (which can be categorical or discrete attributes) to a vector of continuous numbers.

A "workload" can refer to any collection of one or more activities performed in response to a database query (or multiple database queries). "Workload characteristics" can refer to attributes of a workload, such as any or some combination of the following: a type of a database query that produced the workload; a source of a database query (e.g., a human, a program, a machine, etc.), a priority of a database query, a response time goal for a database query, a throughput goal for a database query, and so forth. Workloads that share similar attributes may be assigned to corresponding workload groups (each workload group is represented by a workload definition). A workload definition defines characteristics of a workload group as well as various rules associated with the workload group.

A "user behavior" can refer to characteristics that represent activities of a user that issues database queries that produce workloads in a database domain. A "user" can refer to any or some combination of a human, a program, a machine, etc. Examples of user behaviors can include the following: a type of workload being run by a user, such as an analytical workload (that performs analytics of data), an extract, transform, and load (ETL) workload (that retrieves, transforms, and loads data into a database system), a data exploration workload (that performs data mining), and so forth.

The ability to determine a user behavior can allow a system to understand what a user is doing and to predict what the user will do. As an example, a user may express an intent to perform an ETL workload, but a system may determine that the user is actually performing analytical workloads. A user behavior may impact decision making regarding resources of a database system to allocate to workloads initiated by the user (e.g., more or less or different types of resources may be allocated depending upon the determined user behavior). As another example, a user behavior may impact which database system from among multiple different database systems (e.g., database systems in the cloud as provided by different cloud providers) to use for executing workloads of the user. More generally, the ability to determine a user behavior can assist in determining a configuration of a database system for performing workloads of the user. Note that user behaviors can change over time, so that database system configurations can change accordingly.

In some examples, once a user behavior is determined based on feature vector(s) produced by a query featurization technique or mechanism according to some examples of the present disclosure, a system can either adjust a database system configuration for performing workloads of the user, or can provide a recommendation to the user regarding a proposed database system configuration to use.

In some cases, user behaviors can be determined from workload characteristics, or vice versa.

In some examples, the feature vector produced by an embedding machine learning model of a query featurization technique or mechanism according to some examples of the present disclosure is a fixed-length feature vector that encodes both the structure and attributes of an internal representation of a database query used in a database system. This fixed-length feature vector is also referred to as an "embedding." A "fixed-length" feature vector refers to a quantity of features included in the feature vector. Feature vectors produced by the embedding machine learning model according to some examples of the present disclosure have the same fixed length (i.e., same fixed quantity of features) regardless of what query plans are used to produce the feature vectors.

Each fixed-length feature vector that is part of a distributed representation produced by the embedding machine learning model can encode more information about database queries than possible using traditional feature vectors. The structure and content of an input graph representation representing a query plan produced by a database system can be embedded into a feature vector, such that connections between nodes as well as content (attributes) of the nodes and edges of the input graph representation can be represented by the feature vector. The content of the nodes can indicate what relational tables are involved, when database operations are performed, the types of accesses performed, whether executable steps can be performed in parallel, resource usage estimates, and so forth.

Feature vectors produced by the embedding machine learning model can then be used in various analysis tasks, which can include clustering tasks as well as tasks performed by machine learning models that perform machine learning tasks, including predictions, classifications, routing of database queries, similarity searches, and so forth. Effectively, graph-level embeddings that encode graph structural information in fixed-length feature vectors can be input to analysis tasks.

Figure 1:
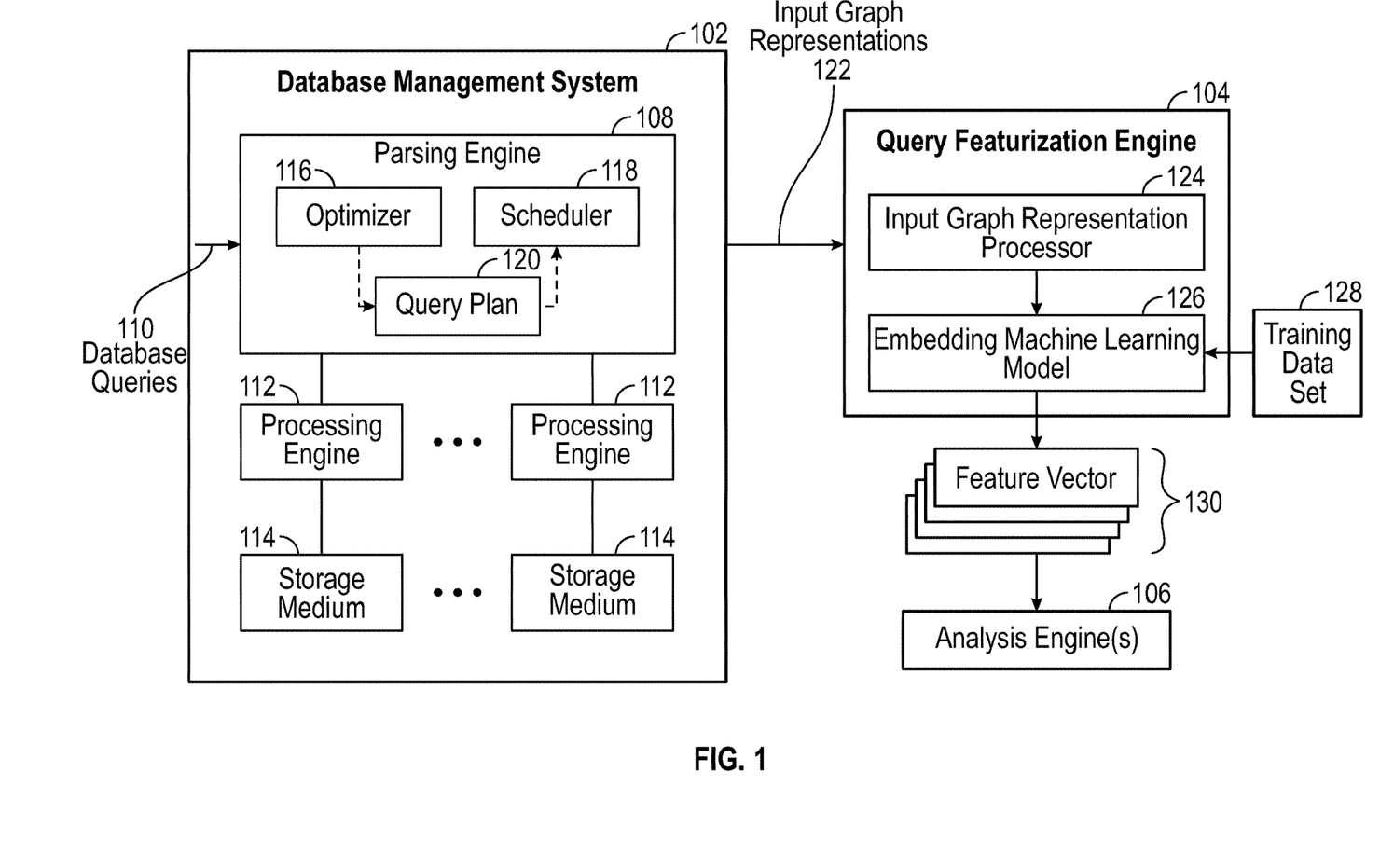
FIG. 1 is a block diagram of an example arrangement including a database management system, a query featurization engine, and one or more analysis engines, in accordance with some implementations of the present disclosure.

FIG. 1 is a block diagram of an example arrangement that includes a database management system (DBMS) 102, a query featurization engine 104, and one or more analysis engine(s) 106. The DBMS 102 includes a parsing engine 108 that is able to process database queries 110, such as SQL queries including data definition language (DDL) statements and data manipulation language (DML) statements.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

Although FIG. 1 shows just one DBMS 102, in other examples, there may be more than one DBMS.

In addition to the parsing engine 108, the DBMS 102 includes multiple processing engines 112. In some examples, the multiple processing engines 112 include respective different computer nodes. In other examples, the multiple processing engines 112 include respective different processors or cores of multi-core processors.

The multiple processing engines 112 are able to execute in parallel with one another, and are able to access, in parallel, different data portions, such as different portions of relational tables that are stored in corresponding storage media 114. A "storage medium" can include one or more storage devices (or portions of one or more storage devices), such as disk-based storage devices, solid-state drives, and so forth. In other examples, the data portions can be stored in a remote data store, such as a remote data store that stores objects. A remote object store can be according to any of the following: Simple Storage Service (S3) from AMAZON WEB SERVICES (AWS), Google Cloud Storage, Microsoft AZURE, and so forth.

Each processing engine 112 is able to perform a local database operation, such as a join operation (e.g., to join data from multiple tables), a data aggregation operation (to aggregate multiple pieces of data into an aggregate value, such as a sum, maximum, minimum, average, median, etc.), and so forth.

In other examples, the DBMS 102 can include just one processing engine 112.

As further shown in FIG. 1, the parsing engine 108 of the DBMS 102 can include an optimizer 116 and a scheduler 118. The optimizer 116 or scheduler 118 can be part of the hardware processing circuit of the parsing engine 108, or can include machine-readable instructions executable on the parsing engine 108.

The parsing engine 108 receives database queries (such as SQL queries, load requests, etc.) submitted by one or more client devices (not shown), which may be coupled to the DBMS 102 over an interconnect (e.g., a network). The parsing engine 108 parses each received database query, and generates executable steps for the parsed query. The optimizer 116 can generate multiple candidate query plans in response to a database query. The optimizer 116 selects the most efficient query plan 120 from among the multiple candidate query plans. Each query plan includes a sequence of executable steps performed to process the database query. The scheduler 118 sends the executable steps of the selected query plan 120 to respective one or more processing engines 112 for execution.

As further shown in FIG. 1, the query featurization engine 104 receives input graph representations 122 from the DBMS 102. In some examples, the query featurization engine 104 can be implemented using one or more computers that are external of the DBMS 102. In other examples, the query featurization engine 104 can be part of the DBMS 102.

Each input graph representation 122 represents one or more query plans produced by the optimizer 116. An input graph representation 122 can be produced by the optimizer 116, or can be produced by a program that is separate from the optimizer 116.

A "graph representation" of a query plan (or multiple query plans) represents various elements of the query plan in graphical form, such as in the form of a tree. The nodes of the graph representation can represent respective executable steps of the query plan, and edges between the nodes can represent an order of execution of the executable steps. Note that some executable steps can be performed in parallel, while other executable steps follow previous executable steps.

The query featurization engine 104 includes an input graph representation processor 124 and an embedding machine learning model 126. The input graph representation processor 124 is able to translate an input graph representation 122 into a different form (discussed further below) that can be used by the embedding machine learning model 126 to produce respective feature vectors 130 corresponding to the input graph representations 122. Note that the features of the feature vectors 130 can be based on attributes of the input graph representations, as well as attributes from another source. In this way, the feature vectors 130 can be augmented to embed additional information from the other source.

A "machine learning model" can refer to a program that identifies patterns in input information to produce an output based on the identified pattern. The machine learning model is trained to recognize the patterns to produce respective outputs.

As depicted in FIG. 1, a training data set 128 can be provided to train the embedded machine learning model 126. The training data set 128 can include a training collection of representations of query plans that are based on graph representations for representative database queries that have been executed in the DBMS 102 or in multiple DBMSs. In some examples, the embedding machine learning model 126 is able to perform self-training based on the training data set 128. In other words, a labeled training data set does not have to be provided to the embedded machine learning model 126 for training of the embedded machine learning model 126. Rather, the embedding machine learning model 126 is able to learn, based on the unlabeled training data set 128, to produce outputs (the feature vectors 130) corresponding to respective inputs.

In some examples, the embedded machine learning model 126 is in the form of a graph autoencoder. A graph autoencoder is able to map graph data (such as graph representations produced by the input graph representation processor 124) into a low-dimensional space (e.g., a fixed-length feature vector 130). A graph autoencoder applies graph embedding of a graphical input, as produced by the input graph representation processor 124, into an embedding that is in the form of a feature vector 130.

A graph autoencoder can be implemented as a neural network that includes an encoder and a decoder. The encoder converts input data into an abstract representation, and the decoder reconstructs the data from the output of the encoder. In other examples, other types of embedding machine learning models 126 can be employed, including embedding machine learning models that are non-neural networks.

The feature vectors 130 produced by the embedding machine learning model 126 are provided to one or more analysis engines 106, which can include any or some combination of the following: a clustering engine to cluster feature vectors, a prediction machine learning model to perform a prediction, a classification machine learning model to classify input data, a summarization machine learning model to perform summarization, a routing machine learning model to route one or more database queries to a selected target DBMS for processing, a similarity search machine learning engine to identify similar database queries, and so forth.

A prediction machine learning engine can make a prediction based on input data, including one or more input graph representations. For example, the prediction machine learning model can predict a usage of a resource of a DBMS, such as a processing resource (e.g., a central processing unit (CPU) or a portion of a CPU), a communication resource (e.g., a network), a storage resource (e.g., a persistent storage or a memory), an input/output (I/O) resource, a virtual resource, a program resource, and so forth.

In other examples, a prediction machine learning model can perform other predictions, such as a prediction of an amount of time to perform one or more database queries, and so forth.

A classification machine learning model can classify a database query into one of multiple classes, based on a feature vector (e.g., 130) for the database query. For example, the multiple classes can represent respective workload different definitions. As another example, the multiple classes can represent respective different user behaviors.

A summarization machine learning model can group database queries into respective clusters of database queries, based on feature vectors (e.g., 130) for the database queries, and the summarization machine learning model can select a database query from each cluster of database queries to use as a representation (summary) of the corresponding cluster.

A routing machine learning model can route a database query to one of multiple DBMSs based on a feature vector the database query. For example, the multiple DBMSs can have different configurations (e.g., different types or amounts of resources, different programs, etc.). Depending on the workload characteristics for the database query, a DBMS with a first configuration can provide more optimal execution of the database query as compared to another DBMS with a second configuration. A "more optimal execution" of a database query can refer to an execution that completes in a shorter period of time, or that utilizes less resources, or that is less costly. In some examples, at least some of the multiple DBMSs can reside in respective cloud environments, which may be provided by the same cloud provider or different cloud providers.

A similarity search machine learning model can find database queries that are similar to a given database query, such as a database query that was previously received or processed. The identification of similar database queries can be based on feature vectors for the database queries.

A clustering engine can cluster database queries into multiple clusters of database queries. In some examples, the feature vectors corresponding to respective database queries can embed information about characteristics associated with the database queries, and such embedded information can be used to cluster the database queries into respective clusters.

In other examples, additional or alternative analysis engines 106 can be employed to produce outputs based on one or more feature vectors 130.

By using the input graph representations of query plans produced by the DBMS 102 in generating the feature vectors 130, the query featurization engine 104 can embed information regarding structures used internally by the DBMS 102 in formulating the feature vectors 130. A database query may go through many highly structured internal representations in the DBMS 102 during the lifecycle of the database query. For example, the parsing engine 108 may parse query text of a database query into a tree structure, and the tree structure is manipulated and augmented in various stages as the optimizer 116 formulates a query plan. By the time the query plan is complete, the tree structure captures relationships among the executable steps of the query plan, the relational tables involved, and so forth. The relationships of the various components (executable steps, relational tables, etc.) provide important information that can be embedded by the embedding machine learning model 126 into a feature vector 130.

Figure 2:
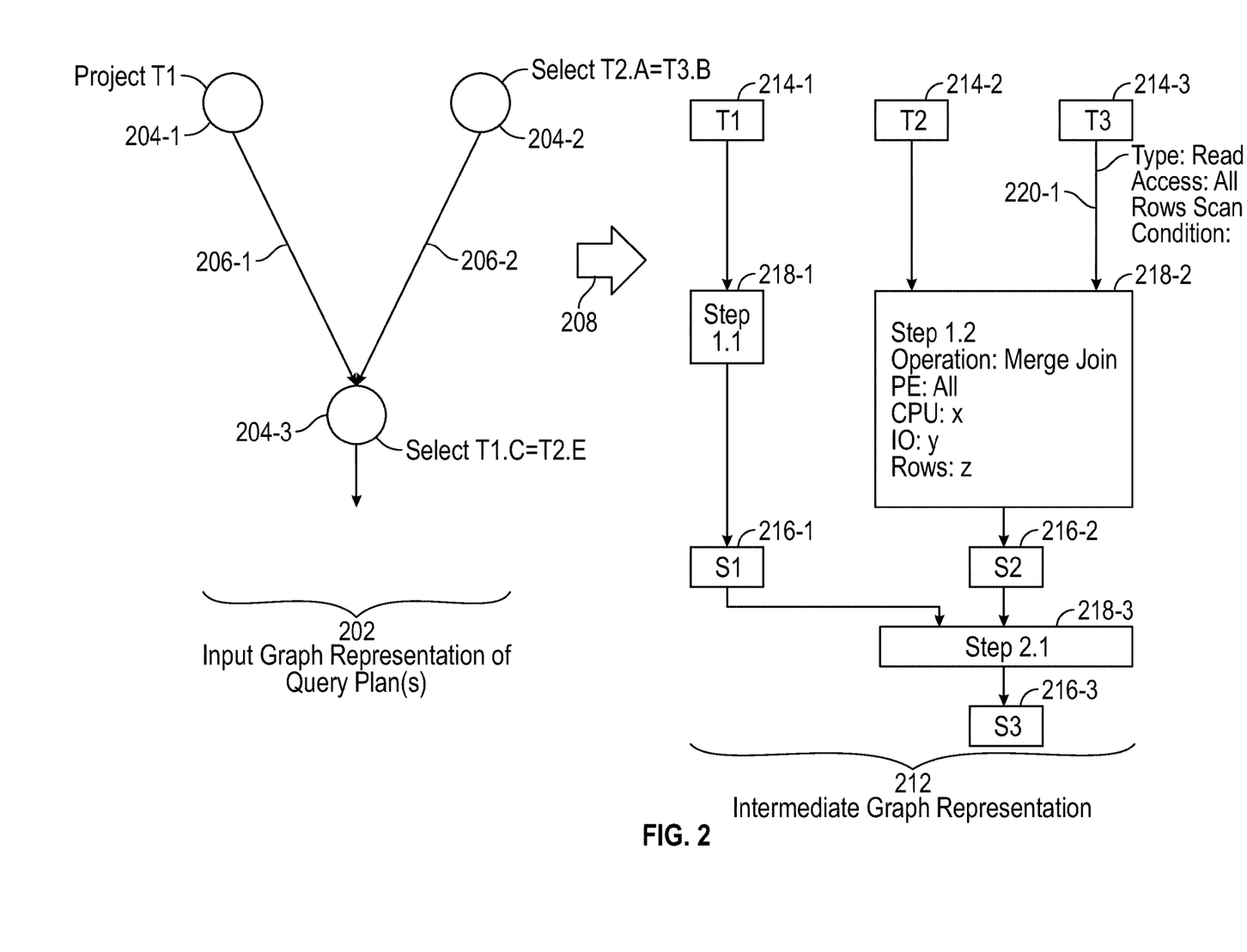
FIG. 2 is a block diagram illustrating conversion of an input graph representation of one or more query plans to an intermediate graph representation, according to some examples of the present disclosure.

The embedding machine learning model 126 can produce node-level feature vectors or graph-level feature vectors. In examples where the embedding machine learning model 126 produces node-level feature vectors (e.g., one feature vector per node of the intermediate graph representation 212), graph-level feature vectors can be derived from the node-level feature vectors. In other examples, graph-level feature vectors (such as 130 in FIG. 1) can be produced directly by the embedding machine learning model 126.

FIG. 2 illustrates an example input graph representation 202 (which is an example of an input graph representation 122 of FIG. 1) of one or more query plans, such as those produced by the optimizer 116 of FIG. 1. The input graph representation 202 can be in the form of a tree, such as a directed attributed graph. Each node and edge between nodes may have associated attributes, and the graph itself may have a set of graph-level attributes. A node's attributes may include resource usage estimates, a name of an operation to be performed at that executable step, and so forth.

In the example shown in FIG. 2, the input graph representation 202 includes nodes 204-1, 204-2, and 204-3. Each node 204-1, 204-2, and 204-3 represents a respective database operation (executable step). For example, the node 204-1 represents a projection of table T1, the node 204-2 represents a join operation that joins tables T2 and T3, and the node 204-3 represents another join operation that joins tables T1 and T2.

Edges 206-1 and 206-2 that interconnect the nodes 204-1, 204-2, and 204-3 indicate that the database operation represented by the node 202-3 occurs after the database operation represented by the nodes 204-1 and 204-2 have been completed. The database operations represented by the nodes 204-1 and 204-2 can be performed in parallel.

In some examples, the input graph representation processor 124 of the query featurization engine 104 of FIG. 1 can convert (at 208) the input graph representation 202 into an intermediate graph representation 212. The intermediate graph representation 212 preserves the connections and attributes of the input graph representation 202 that are to be encoded into the embedding produced by the query featurization engine 104.

The intermediate graph representation 212 includes nodes that represent data structures that are used by database operations, as well as nodes that represent the database operations themselves. In other examples, an intermediate representation different from the intermediate graph representation 212 can be used, such as an intermediate representation in a different form (e.g., not a graph but in the form of a table, etc.). In the example of FIG. 2, nodes 214-1, 214-2, and 214-3 of the intermediate graph representation 212 represent respective tables T1, T2, and T3, which are involved in the database operations represented by the input graph representation 202. Nodes 216-1, 216-2, and 216-3 represent spools (S1, S2, and S3, respectively) that are temporary data structures used to hold the content of outputs of database operations. For example, the spool S1 is used to store the output of Step 1.1, the spool S2 is used just store the output of Step 1.2, and the spool S3 is used just store the output of Step 2.1.

Nodes 218-1, 218-2, and 218-3 represent respective database operations corresponding to respective Steps 1.1, 1.2, and 2.1.

Step 1.1 represented by the node 218-1 is the projection of table T1 represented by the node 204-1 of the input graph representation 202. Step 1.2 represented by the node 218-2 is the join operation represented by the node 204-2 of the input graph representation 202, and Step 2.1 represented by the node 218-3 is the database operation represented by the node 204-3 of the input graph representation 202.

Each of the nodes as well as edges between nodes in the intermediate graph representation 212 can be associated with a collection of attributes. For example, an edge 220-1 between node 214-3 and node 218-2 is associated with a Type attribute (e.g., a type of access of table T3 represented by the node 214-3, such as a read access, a write access, etc.), an Access attribute that indicates a portion of an input data structure (e.g., T3) that is accessed (e.g., all rows read, a percentage of rows read, etc.), and a Condition attribute that indicates a condition under which the input data structure is accessed. Although example attributes are depicted for the edge 220-1, in other examples, an edge of the intermediate graph representation 212 can be associated with additional or alternative attributes.

The node 218-2 representing Step 1.2 is also associated with various attributes, including an Operation attribute to indicate the type of database operation (e.g., a merge join, etc.), a PE attribute to indicate which processing engines 112 are involved in the database operation (all processing engines, a subset of processing engines, a single processing engine, etc.), a CPU attribute that indicates an estimated quantity of CPU cycles expected to be consumed, an I/O attribute that indicates an estimated quantity of I/O cycles expected to be consumed, a Rows attribute to indicate an estimated quantity of rows of the table that are expected to be read, and so forth.

Although not shown, each of the other nodes and edges between nodes can be associated with a respective collection of attributes. A "collection of attributes" can refer to a single attribute or multiple attributes.

In some examples, collections of attributes associated with the nodes and edges of the intermediate graph representation 212 that may have a much higher dimensionality than the dimensionality of a fixed-length feature vector 130 output by the embedding machine learning model 126. In other words, there may be many more attributes associated with a node or edge of the intermediate graph representation 212 than features of a feature vector 130.

Use of the intermediate graph representation 212 allows the query featurization engine 104 to preserve information that relevant to a target use case, while information not relevant to the target use case can be discarded. A target use case can be associated with a type of analysis engine 106 for which feature vector(s) is (are) to be generated. Some of the information of the input graph representation 202 may not be relevant to the target use case associated with a given analysis engine 106. Such information can be discarded and not included in the intermediate graph representation 212. For example, attributes of the input graph representation 202 that may not be relevant to making a prediction by a prediction machine learning model can be discarded and not included in the intermediate graph representation 212.

Discarding irrelevant information for a target use case can reduce the amount of information that has to be processed by the embedding machine learning model 126, which can increase the efficiency and speed of execution of the embedding machine learning model 126.

In some examples, the input graph representation processor 124 when generating the intermediate graph representation 212 based on the input graph representation 202 can add information (e.g., attributes) to the intermediate graph representation 212 from another source.

In some examples, the input graph representation processor 124 can convert the intermediate graph representation 212 into a tensor-based graph representation. This conversion is performed in examples where the embedding machine learning model 126 is applied on tensor-based graph representations. In other examples, the embedding machine learning model 126 is applied on the intermediate graph representation 212. In yet further examples, the embedding machine learning model 126 is applied on the input graph representation 202.

An example tensor-based graph representation can be in the form of a homogeneous graph (where all nodes are of the same type) or a non-homogeneous graph (where nodes can be of different types). An example homogeneous graph can be built using the PyTorch Geometric (PyG) library, which is a library used to create and train graph neural networks. In other examples, other types of tensor-based graphs can be employed.

PyG represents homogeneous graphs with three tensors collected in a class called Data. The three tensors are x, edge_index, and edge_attr.

The tensor x represents the nodes and their attributes, and has the form [num_nodes, num_node_features], i.e., there are num_nodes rows in the tensor x, and each row has num_node_features entries. The value num_nodes represents the number of nodes in the intermediate graph representation 212, and the value num_node_features represents the number of attributes associated with each node. Each row of the tensor x is a feature vector of a node.

The following example of a tensor x converted from the intermediate graph representation 212 of FIG. 2 includes a row for each of the nine nodes (214-1, 214-2, 214-3, 216-1, 216-2, 216-3, 218-1, 218-2, 218-3) in the intermediate graph representation 212 (the numbers in each row are made up numbers for purposes of illustration). The features for a node may include a one-hot encoding of a database operator, scaled/transformed values for metrics like CPU, I/O, and Rows, and so forth. One-hot encoding is a process by which attributes are converted into a form (such as the example numbers in the tensor x below) that can be provided to a machine learning model.

```
tensor([ [1.0000, 0.0000, 0.0000, 0.0000, 0.0000, 0.0000, 0.0000, 0.0000],
    [1.0000, 0.0000, 0.0000, 0.0000, 0.0000, 0.0000, 0.0000, 0.0000],
    [1.0000, 0.0000, 0.0000, 0.0000, 0.0000, 0.0000, 0.0000, 0.0000],
    [0.0000, 0.0000, 0.0000, 1.0000, 0.0478, 0.0771, 0.1890, 0.6147],
    [0.0000, 0.0000, 0.0000, 1.0000, 0.9423, 0.3902, 0.0881, 0.4613],
    [1.0000, 0.0000, 0.0000, 0.0000, 0.0000, 0.0000, 0.0000, 0.0000],
    [1.0000, 0.0000, 0.0000, 0.0000, 0.0000, 0.0000, 0.0000, 0.0000],
    [0.0000, 0.0000, 0.0000, 1.0000, 0.0436, 0.1032, 0.0000, 0.6755],
    [1.0000, 0.0000, 0.0000, 0.0000, 0.0000, 0.0000, 0.0000, 0.0000] ]).
```

The tensor edge_index encodes the existence of edges between nodes (each edge is from a source node to a target node). The form of the tensor edge_index is [2, num_edges]. The tensor edge_index has 2 rows and each row has num_edges entries, where the value num_edges represents the number of edges in the intermediate graph representation 212. For this example, assume tables T1 to T3 are represented by nodes indexed 0 to 2, respectively, Steps 1.1, 1.2, and 1.3 are represented by nodes indexed 3 to 5, respectively, and spools S1, S2, and S3 are represented by nodes indexed 6 to 8.

An example tensor edge_index for the intermediate graph representation 212 is provided below.

```
tensor([ [0, 1, 2, 3, 4, 5, 6, 7],
    [3, 4, 4, 5, 6, 7, 7, 8] ]).
```

The example tensor edge_index above has 2 rows and 8 columns. In the first column, the pair (0, 3) indicates an edge from source T1 (represented by a node indexed 0) to target Step 1.1 (represented by a node indexed 3).

The tensor edge_attr encodes the edge attributes, similar to the tensor x that encodes the node attributes. The form of the tensor edge_attr is [num_edges, num_edge_features]. There are num_edges rows in the tensor edge_attr, and each row has num_edge_features entries. The value num_edges represents the number of edges in the intermediate graph representation 212, and the value num_edge_features represents the number of attributes associated with each edge.

An example tensor edge_attr for the intermediate graph representation 212 is provided below, again with made up numbers, where 0 represents a read and 1 represents a write.

```
tensor([ [0],
    [0],
    [0],
    [1],
    [1],
    [1],
    [0],
    [0],
    [1] ]).
```

Figure 3:
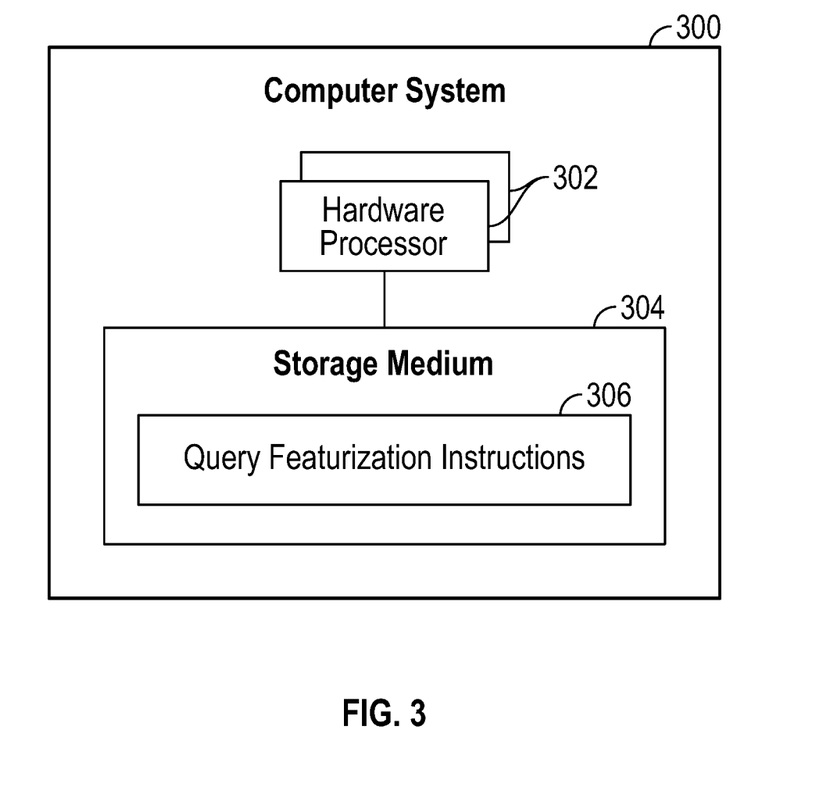
FIG. 3 is a block diagram of a computer system according to some examples of the present disclosure.

FIG. 3 is a block diagram of a computer system 300, which can be part of the DBMS 102 of FIG. 1, or separate from the DBMS 102.

The computer system 300 includes one or more hardware processors 302 and a non-transitory storage medium 304 that stores machine-readable instructions executable by the one or more hardware processors 302. A hardware processor can include a microprocessor, a core of a multi-core microprocessor, a microcontroller, a programmable integrated circuit, a programmable gate array, or another hardware processing circuit.

The machine-readable instructions include query featurization instructions 306 that receive an input graph representation (e.g., 122 in FIG. 1 or 202 in FIG. 2) of one or more query plans for one or more database queries. The one or more query plans can be generated by an optimizer of a DBMS.

The query featurization instructions 306 generate, using an embedding machine learning model (e.g., 126 in FIG. 1) based on the input graph representation, a feature vector that provides a distributed representation of the one or more query plans.

The query featurization instructions 306 determine, using the feature vector, one or more user behaviors and/or workload characteristics of one or more workloads in a DBMS.

In some examples, the determining of the one or more user behaviors and/or workload characteristics is performed by a machine learning model using the feature vector.

In some examples, the query featurization instructions 306 generate, based on the input graph representation, an intermediate graph representation (e.g., 212 in FIG. 2) that includes intermediate graph representation nodes representing steps of the one or more query plans and input and output data structures (e.g., relational tables and spools). The intermediate graph representation also includes intermediate graph representation edges between the intermediate graph representation nodes according to the relationship between the steps of the input graph representation. In some examples, the feature vector is generated based on the intermediate graph representation.

In some examples, the query featurization instructions 306 generate, based on the intermediate graph representation, a tensor-based graph representation of the one or more query plans. The feature vector can be generated based on the tensor-based graph representation.

The storage medium 304 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause one or more processors to:
   receive an input graph representation of one or more query plans for one or more database queries, wherein a query plan of the one or more query plans comprises input graph nodes representing executable steps to be executed to satisfy a database query of the one or more database queries, and input graph edges between the input graph nodes, the input graph edges representing a relationship between the executable steps;
   obtain an intermediate graph representation of the one or more query plans, the intermediate graph representation comprising intermediate graph nodes and intermediate graph edges between the intermediate graph nodes, wherein the intermediate graph nodes are associated with node attributes and the intermediate graph edges are associated with edge attributes, the node attributes and the edge attributes forming a collection of attributes, and wherein the intermediate graph nodes represent executable steps of the one or more query plans and input and output data structures used by the executable steps of the one or more query plans;
   generate, by an embedding machine learning model based on the intermediate graph representation, a feature vector that provides a distributed representation of the one or more query plans, wherein the feature vector has fewer features than a quantity of attributes in the collection of attributes associated with the intermediate graph representation; and
   determine, using the feature vector, one or more user behaviors and/or workload characteristics of one or more workloads in one or more database systems.

2. The non-transitory machine-readable storage medium of claim 1, wherein the determining of the one or more user behaviors and/or workload characteristics is performed by a machine learning model using the feature vector.

3. The non-transitory machine-readable storage medium of claim 1, wherein the one or more query plans represented by the intermediate graph representation is produced by an optimizer of the one or more database systems.

4. The non-transitory machine-readable storage medium of claim 1, wherein the instructions upon execution cause the one or more processors to:
   generate, based on the input graph representation, the intermediate graph representation, wherein the intermediate graph edges represent relationships between the executable steps of the one or more query plans and between the executable steps of the one or more query plans and the input and output data structures.

5. The non-transitory machine-readable storage medium of claim 4, wherein the intermediate graph representation includes attributes of the input graph representation relevant to a target use case, and excludes one or more attributes of the input graph representation not relevant to the target use case.

6. The non-transitory machine-readable storage medium of claim 4, wherein the instructions upon execution cause the one or more processors to:
   generate, based on the intermediate graph representation, a tensor-based graph representation of the one or more query plans, wherein the generating of the feature vector is based on the tensor-based graph representation.

7. The non-transitory machine-readable storage medium of claim 1, wherein the instructions upon execution cause the one or more processors to:
train the embedding machine learning model to embed graph representations of query plans into feature vectors.

8. The non-transitory machine-readable storage medium of claim 7, wherein the training of the embedding machine learning model comprises a self-learning training using a training collection of representations of query plans.

9. The non-transitory machine-readable storage medium of claim 7, wherein the embedding machine learning model comprises a neural network.

10. The non-transitory machine-readable storage medium of claim 1, wherein the feature vector is a fixed length feature vector having a fixed length, and wherein the embedding machine learning model produces feature vectors of the fixed length regardless of what query plans are input to the embedding machine learning model to produce the feature vectors.

11. The non-transitory machine-readable storage medium of claim 1, wherein the determining of the one or more user behaviors and/or workload characteristics of the one or more workloads in the one or more database systems comprises:
assigning database queries to respective clusters, or
generating workload groups comprising respective workloads.

12. The non-transitory machine-readable storage medium of claim 1, wherein the collection of attributes comprises an access type attribute representing a type of access of a data structure by a database operation in a query plan, and a processing engine attribute indicating which processing engine of a plurality of processing engines is involved in the database operation.

13. The non-transitory machine-readable storage medium of claim 1, wherein the instructions upon execution cause the one or more processors to:
classify, by a machine learning model using the feature vector, database queries that produce the one or more workloads into a plurality of classes.

14. The non-transitory machine-readable storage medium of claim 1, wherein the instructions upon execution cause the one or more processors to:
route, by a machine learning model using the feature vector, a database query to a selected database system of a plurality of database systems.

15. The non-transitory machine-readable storage medium of claim 1, wherein the instructions upon execution cause the one or more processors to:
predict, by a predictive machine learning model using the feature vector, a resource usage of the one or more workloads.

16. A computer system comprising:
one or more hardware processors; and
a non-transitory storage medium storing instructions executable on the one or more hardware processors to:
receive an input graph representation of one or more query plans for one or more database queries, wherein a query plan of the one or more query plans comprises input graph nodes representing executable steps to be executed to satisfy a database query of the one or more database queries, and input graph edges between the input graph nodes, the input graph edges representing a relationship between the executable steps;
obtain an intermediate graph representation of the one or more query plans, the intermediate graph representation comprising intermediate graph nodes and intermediate graph edges between the intermediate graph nodes, wherein the intermediate graph nodes are associated with node attributes and the intermediate graph edges are associated with edge attributes, the node attributes and the edge attributes forming a collection of attributes, and wherein the intermediate graph nodes represent executable steps of the one or more query plans and input and output data structures used by the executable steps of the one or more query plans;
generate, by an embedding machine learning model based on the first intermediate_graph representation, a feature vector that provides a distributed representation of the one or more query plans, wherein the feature vector has fewer features than a quantity of attributes in the collection of attributes associated with the intermediate graph representation; and
determine, using the feature vector, one or more user behaviors and/or workload characteristics of one or more workloads in one or more database systems.

17. The computer system of claim 16, wherein the determining of the one or more user behaviors and/or workload characteristics of the one or more workloads is performed by a machine learning model using the feature vector.

18. The computer system of claim 16, wherein the one or more query plans are produced by an optimizer of the one or more database systems, and wherein the instructions are executable on the one or more hardware processors to:
generate, based on the input graph representation, the intermediate graph representation, wherein the input and output data structures represented by the intermediate graph nodes comprise tables and spools.

19. A method of a computer system, comprising:
receiving an input graph representation of one or more query plans for one or more database queries, the input graph representation comprising input graph nodes representing executable steps of the one or more query plans, and input graph edges representing relationships between the executable steps;
generating, by the computer system, an intermediate graph representation from the input graph representation, the intermediate graph representation comprising:
intermediate graph nodes representing the executable steps and input and output data structures used by the executable steps, and
intermediate graph edges representing relationships between the executable steps and between the executable steps and the input and output data structures, wherein the intermediate graph nodes are associated with node attributes and the intermediate graph edges are associated with edge attributes, the node attributes and the edge attributes forming a collection of attributes;
generating, by an embedding machine learning model based on the intermediate graph representation, a feature vector that provides a distributed representation of the one or more query plans, wherein the feature vector has fewer features than a quantity of attributes in the collection of attributes associated with the intermediate graph representation; and
determining, by the computer system using the feature vector, one or more user behaviors and/or workload characteristics of one or more workloads in one or more database systems.

* * * * *